United States Patent
Amrhein et al.

(10) Patent No.: US 6,794,070 B2
(45) Date of Patent: Sep. 21, 2004

(54) FUEL CELL APPARATUS WITH COMPRESSOR MEANS FOR REDUCING FUEL LEAKAGE DANGER AND IMPROVING EFFICIENCY

(75) Inventors: Wilhelm Amrhein, Eberdingen (DE); Gesine Arends, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 10/299,553

(22) Filed: Nov. 19, 2002

(65) Prior Publication Data
US 2003/0124399 A1 Jul. 3, 2003

(30) Foreign Application Priority Data
Nov. 24, 2001 (DE) .......................................... 101 57 708

(51) Int. Cl.[7] .............................................. H01M 8/18
(52) U.S. Cl. ............................. 429/19; 429/34; 429/13; 429/12; 429/26
(58) Field of Search ............................. 429/19, 34, 13, 429/12, 26

(56) References Cited

U.S. PATENT DOCUMENTS 6,047,549 A * 4/2000 Saurer et al. ................. 60/677

FOREIGN PATENT DOCUMENTS

| DE | 199 62 679 A1 | 6/2001 |
|----|---------------|--------|
| EP | 0 977 295 A1 | 2/2000 |
| EP | 1 039 244 A2 | 9/2000 |
| EP | 1 205 993 A12 | 5/2002 |
| WO | 01/59861 A2 | 8/2001 |

* cited by examiner

Primary Examiner—Carol Chaney
Assistant Examiner—Angela J. Martin
(74) Attorney, Agent, or Firm—Michael J. Striker

(57) ABSTRACT

The fuel cell apparatus has a fuel-producing unit (2) for producing hydrogen-enriched fuel (6) and a fuel cell or fuel cell stack (1) for production of electrical energy from the hydrogen-enriched fuel and air. It also includes at least one compressor (5,7; 17) for providing the fuel cell or fuel cell stack with an over-pressure, in order to decisively reduce the danger due to leakage and to guarantee reduced energy consumption and reduced costs for supply of the apparatus. Since at least one operating pressure is less than atmospheric air pressure, the apparatus provides these advantages. The apparatus also preferably includes at least one burner unit (9) for consuming excess hydrogen-containing fluid. In a preferred embodiment one compressor unit is arranged between an outlet of the fuel cell or fuel cell stack and an outlet of the apparatus for exhaust gas in order to provide a low pressure to draw in hydrogen-enriched fuel. Another separate compressor unit is optionally arranged upstream of an entrance to the fuel cell for a second oxygen-containing fluid stream.

12 Claims, 2 Drawing Sheets

FUEL CELL APPARATUS WITH COMPRESSOR MEANS FOR REDUCING FUEL LEAKAGE DANGER AND IMPROVING EFFICIENCY

BACKGROUND OF THE INVENTION

1. Field of the Invention

The present invention relates to a fuel cell apparatus comprising a fuel cell and a fuel-producing unit that produces a hydrogen enriched fuel and, more particularly, to a fuel cell apparatus comprising a fuel cell unit and a fuel-producing unit, which has at least one compressor for producing an operating pressure for the fuel cell apparatus.

2. Description of the Related Art

Fuel cells are electrochemical converters of chemical energy into electrical energy. A fuel cell comprises an anode, at which a substance is electrochemically oxidized, a cathode, at which another substance is electrochemically reduced and an electrolyte facilitating ionic charge transport between both electrodes. For simplification in the following description the substance to be oxidized is designated or called the "fuel". Accordingly without further loss of generality the substance to be reduced or oxidizing agent is designated with the term "air".

Basically the fuel cell apparatus can be a single fuel cell, but also an electrical and/or electrochemical circuit or assembly of several individual fuel cells. Besides the electrical and/or electrochemical circuit one also finds a structure, which supplies and/or transports products away from the electrodes, in the fuel cell or fuel cell stack. Also peripheral components, which, for example, are necessary to supply gas, for heat management and for control engineering, are provided in the fuel cell apparatus.

In many cases it is necessary to obtain, and also produce a hydrogen-enriched fuel for the fuel cell from, hydrocarbons, such as natural gas, gasoline, diesel fuel, methanol or the like. For that purpose a suitable fuel converter unit for conversion of hydrocarbons to a hydrogen-enriched fuel is required.

Frequently so-called PEM fuel cells are used in conventional fuel cell apparatus. These PEM fuel cells react especially with carbon monoxide components in the hydrogen-enriched medium to form a CO coating on the cathode electrode, so that conversion of the hydrogen on that electrode is difficult and/or prevented. The production of the CO coating on the cathode is generally designated as "poisoning" the cathode by those skilled in the art. For this reason the corresponding fuel cell apparatus guarantees the production of a largely or mostly carbon monoxide-free, hydrogen-enriched medium. Thus the carbon monoxide components in the hydrogen-enriched reformat and/or fuel are nearly completely reduced with the help of reactors.

The components of a suitable fuel cell apparatus have transport and/or operating resistances for the fuel and/or operating material. For example, the fuel production unit, the fuel cell itself, the after-burning units and the conducting pipes and valves all have a fluid flow resistance, which must be overcome in operation.

Currently compressors or the like, which act on the fuel cell apparatus, especially the fuel cell and/or the fuel-producing unit with an excess- or over-pressure, are used to overcome the corresponding transport and/or operating resistances. With the help of an appropriate over-pressure both the hydrocarbon, air and also the fuel flows are compressed and forced through the various parts of the fuel cell apparatus (see for example EP 0 977 295 A1).

In the fuel cell apparatus according to the state of the art however it is disadvantageous that an undesirable leakage of the hydrogen-enriched fuel or the like can occur from the apparatus. This causes a potential danger to the apparatus. Furthermore the compression effort and expense, above all, because of the use of two compressors for air and combustible gases, is relatively large.

SUMMARY OF THE INVENTION

It is an object of the present invention to provide an improved fuel cell apparatus of the above-described kind, including at least one fuel cell and a fuel-producing unit, which does not have the above-described disadvantage.

It is a further object of the present invention to provide a fuel cell apparatus of the above-described kind, including at least one fuel cell and a fuel-producing unit for making hydrogen-enriched fuel, which has at least one compressor for producing an operating pressure of the fuel cell apparatus, which guarantees a careful operation of the fuel cell apparatus with its operating substances with reduced effort and/or reduced expense and, at the same time, decisively reduces the dangerous potential for leakage.

This object, and others which will be made more apparent hereinafter, are attained in a fuel cell apparatus including at least one fuel cell and a fuel-producing unit for making a hydrogen-enriched fuel, in which at least one compressor is provided for producing at least one operating pressure in the fuel cell apparatus.

According to the invention the at least one operating pressure is less than atmospheric pressure.

Various advantageous embodiments of this apparatus are possible, some of which are described hereinbelow.

Accordingly in a preferred embodiment the operating pressure on the fuel cell apparatus on its gas side is less than atmospheric pressure.

In the fuel cell apparatus according to the invention, with the above-described features, the at least one fuel cell is operated at an over-pressure, because the hydrogen-enriched fuel supplied to the fuel cell is acted on by an under-pressure or low-pressure drawing it through the fuel cell. This guarantees that at least no hydrogen-enriched fuel can escape in case of a leak from the fuel cell apparatus, which effectively eliminates the danger from such leaks in an advantageous manner.

The compressor unit or compressor units for producing the under-pressure are preferably arranged downstream of the fuel cell or fuel cells in the flow direction. Preferably the pressure-producing unit is arranged between the fuel cell and an outlet for exhaust gas. These features guarantee that at least one operating medium, i.e. the hydrogen-enriched fuel, the air, the nearly pure oxygen or the like, is acted on with the under-pressure produced by the at least one compressor. Thus the at least one compressor pulls or draws the at least one operating medium into the fuel cell according to the invention.

Also only one low-pressure-producing device according to the invention is arranged upstream of the outlet for the exhaust gas from the fuel cell apparatus. For this reason the number of required pressure-generating units is reduced in comparison to the state of the art. The efficiency, the costs and failure susceptibility of the fuel cell apparatus according to the invention are thus substantially improved.

In preferred embodiments of the invention the compressor or compressors for producing the low pressure are arranged downstream of an outlet for the hydrogen-enriched fuel from the at least one fuel cell. This guarantees that the hydrogen-enriched fuel is acted on with the under-pressure. Because of this feature of the apparatus no hydrogen-containing fluid and/or gas can escape from the fuel cell apparatus in case of a leak. Thus dangerous leakage conditions are avoided.

In especially preferred embodiments of the invention a separate compressor unit for producing an over-pressure in the oxygen-containing second fluid flow into the fuel cell or fuel cells is arranged at least upstream of an entrance to the fuel cell or fuel cells for the second fluid flow. In these embodiments the compression work for compression of the oxygen-containing second fluid flow, especially air, nearly pure oxygen or the like, is considerably reduced, since only the cathode-side flow resistance of the at least one fuel cell is overcome by means of this compressor unit. That is the e.g. air is not to be compressed to the pressure level above the fuel cell pressure level.

The anode side flow resistance of the fuel cell apparatus or the at least one fuel cell is already exceeded by means of the at least one compressor or by its under-pressure. Consequently, above all, the separate compressor unit, e.g., can be a comparatively simple blower, which only produces a comparatively small pressure difference or over-pressure. In contrast generally a compressor which produces a comparatively high-pressure difference, must be used to overcome the flow resistance on the cathode side of the fuel cell apparatus.

In preferred embodiments of the apparatus according to the invention at least one, e.g. catalytically active, burner unit for combustion of the hydrogen-containing fluid is arranged downstream of the fuel cell or fuel cells. These features permit energy conversion of the residual hydrogen of the fuel cell unit to improve the total efficiency of the fuel cell apparatus. For example the heat of the burner unit can be supplied for further use, preferably by means of a heat exchanger. Hot water can be produced or a building can be heated, among other applications, by a stationary fuel cell apparatus according to the invention. The mobile fuel cell apparatus according to the invention can be used to at least partially heat a vehicle in which it is installed.

A heating or heat supply of parts to be heated of the fuel cell apparatus can occur in the stationary and mobile fuel cell apparatus. If necessary fluids for certain operating situations or uses can be temporarily stored by means of additional temporary storage reservoirs for temporary storage of hydrogen-containing fluids. For example, the cold starting behavior and/or the operation of parts of the fuel cell apparatus with comparatively higher operating parameters can be improved.

In a preferred embodiment of the invention the at least one compressor and the burner unit are formed as a common structural unit. Currently compact structural units exits, in which a compression means is arranged upstream in the flow direction from the burner unit and/or integrated with it, so that a connecting pipe between them can be eliminated. This leads to an increase in the safety of the apparatus according to the invention. Standard commercial parts can be used in an advantageous manner. This permits an economical manufacture of the fuel cell apparatus according to the invention.

Preferably a hydrocarbon-containing starting material acted on with an over-pressure is supplied. For example, natural gas, city gas or the like, preferably from the community gas supply or a comparatively high-volume pressurized tank, is used with stationary fuel cell apparatus. Suitable hydrocarbon containing gases already have a certain over-pressure, so that the flow and/or operating resistances of the fuel cell apparatus, especially of the at least one fuel cell, can be overcome. The at least one compressor and/or the compressor unit can be comparatively small and thus has a more economical and efficient size. This improves the manufacturing economy and/or the operation of the fuel cell apparatus according to the invention.

Generally one or more sensors can be provided to detect leaks in the fuel cell apparatus, especially in the parts for supply of substances to it and/or their pipes or ducts. For example, pressure sensors, hydrogen gas sensors or the like, can be used to measure any pressure drop or increase and/or a dilution of the hydrogen-containing medium because of admission of air or the like. Signals for these sensors are conducted to control and analysis units as needed. The corresponding control and/or evaluation devices control process steps preferred in these special operating situations, which permit controlled switch off of the fuel cell apparatus, if necessary.

Basically the safety of the fuel cell apparatus according to the invention with one or more sections, which are charged with dangerous materials, such as hydrogen-containing fluids, natural gas or the like, is decisively improved.

BRIEF DESCRIPTION OF THE DRAWINGS

The objects, features and advantages of the invention will now be described in more detail with the aid of the following description of the preferred embodiments, with reference to the accompanying figures in which.

DETAILED DESCRIPTION OF THE INVENTION

Figure 1:
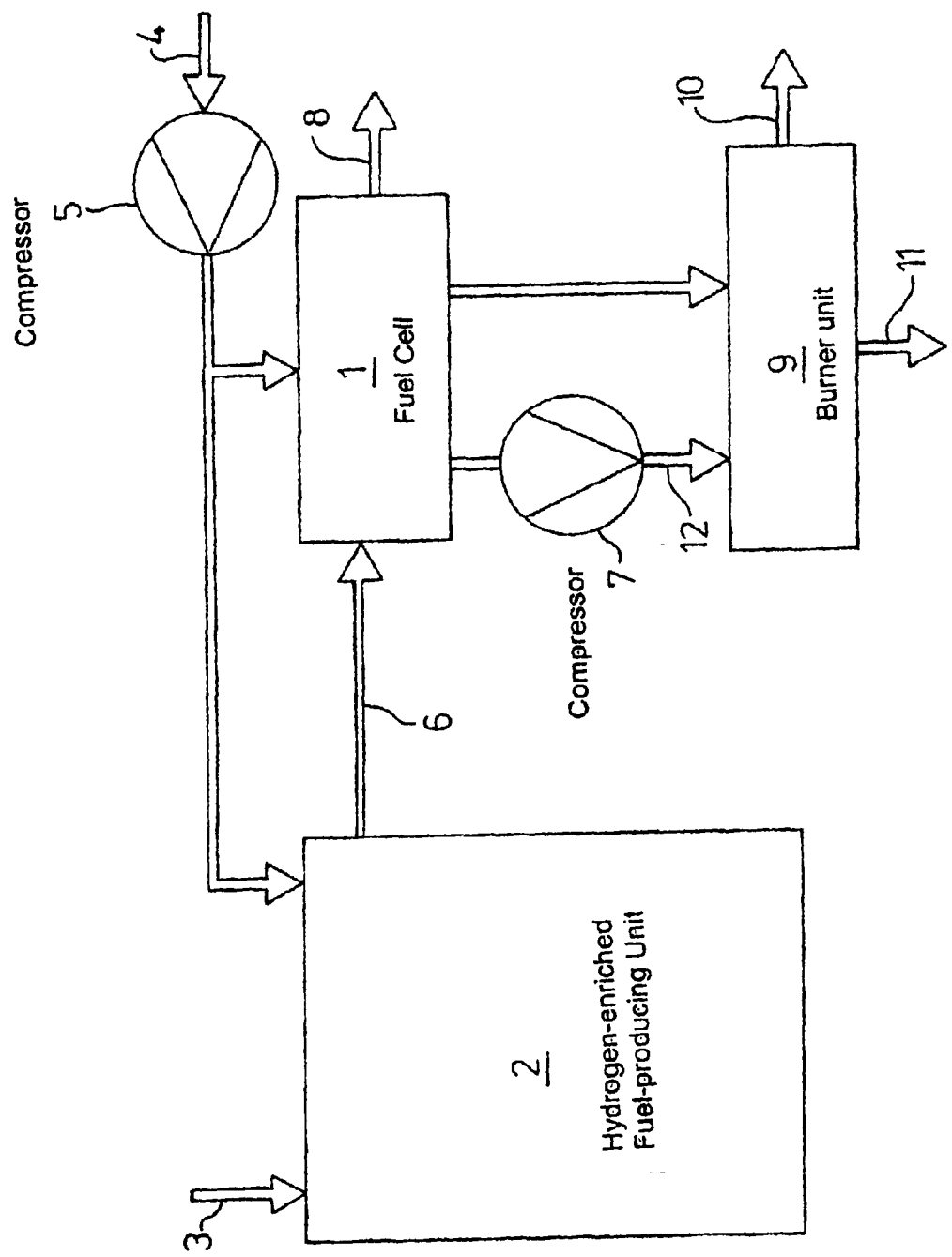
FIG. 1 is a schematic block diagram of a first embodiment of the fuel cell unit according to the invention.

FIG. 1 shows a fuel cell apparatus according to the invention, which comprises a fuel cell stack 1 and a fuel-producing unit 2. A hydrocarbon starting material 3, for example natural gas, gasoline, diesel fuel or the like, flows into the fuel-producing unit 2.

In many embodiments an oxygen-containing substance, for example air 4, is required for fuel production in addition to the hydrocarbon starting material 3. Accordingly flow resistance can be optionally overcome by means of a compressor 5 for supplying air 4 to the fuel-producing unit 2 and/or the fuel cell stack 1. In an unshown manner a metering device for metering the air 4 supplied to both components 1,2 can be provided.

A hydrogen-enriched fuel 6 flows from the fuel-producing unit 2 into the fuel cell stack 1.

A pump or another compressor 7, which is arranged downstream in the flow direction from the fuel cell stack 1, produces an anode-side operating pressure, which is less than atmospheric air pressure, so that the fuel 6 fuel-producing unit 2 is drawn into the fuel cell stack 1.

According to the invention leakage from the fuel-producing unit 2, the supply of the fuel 6 to the fuel cell stack 1, in the fuel cell stack 1 itself and the outflow conductor from the fuel cell stack does not lead to release of any hydrogen-containing gas. Consequently the fuel cell apparatus according to the invention is safe from fuel and/or hydrogen gas release, which reduces decisively the danger from this apparatus.

Because of the low pressure present in the flow direction downstream of the fuel cell stack 1, the supply of air to the fuel-producing unit 2 also can occur without compression of the input air 4 by means of an optional compressor 5. That is the fuel-producing unit 2, if necessary, draws in air 4 from the environment by means of a simple inflow pipe or conductor in a manner that is not shown in detail in the drawing. If necessary a metering valve and/or shut off valve can be provided in this unshown conductor or pipe.

In general advantageously metering elements, such as valves and the like, can be provided for metering the input flows 3, 4 and 6 for the fuel cell apparatus and/for the fuel cell stack 1 in a manner that is not shown in detail in the drawing. These metering elements permit adjustment of the fuel cell apparatus and/or the fuel cell stack 1, as needed, to changing or different operating conditions and/or requirements.

In preferred embodiments the fuel-producing unit 2 includes additional units, such as a desulfurization unit, an evaporating stage, a reformer, one or more shift reactors, a CO purification unit and/or the like. The particular additional units included with the fuel-producing unit 2 depend on the composition of the exhaust gas 3 and/or on the fuel cell stack that is used, e.g. PEM fuel cells or SOFC.

According to the invention only the cathode side of the fuel cell stack 1 needs to be acted on with an overpressure, whereby release of substances from the fuel cell apparatus, except for oxygen and/or air-containing operating medium, is effectively prevented.

According to FIG. 1 the fuel cell stack 1 makes available electrical power 8 and heat 10 from an optional burner 9 for heating individual or several parts of the fuel cell apparatus and/or water for domestic or industrial use, heating water or a vehicle interior or the like.

Exhaust gas 11 containing no hydrogen flows out from the burner 9.

Generally the pump 7 and the burner 9 used in the embodiment shown in FIG. 1 are standard commercial units. The pump 7 is arranged directly at the burner 9 and the pipe 12 shown in the drawing is either not present is very short in practice.

Figure 2:
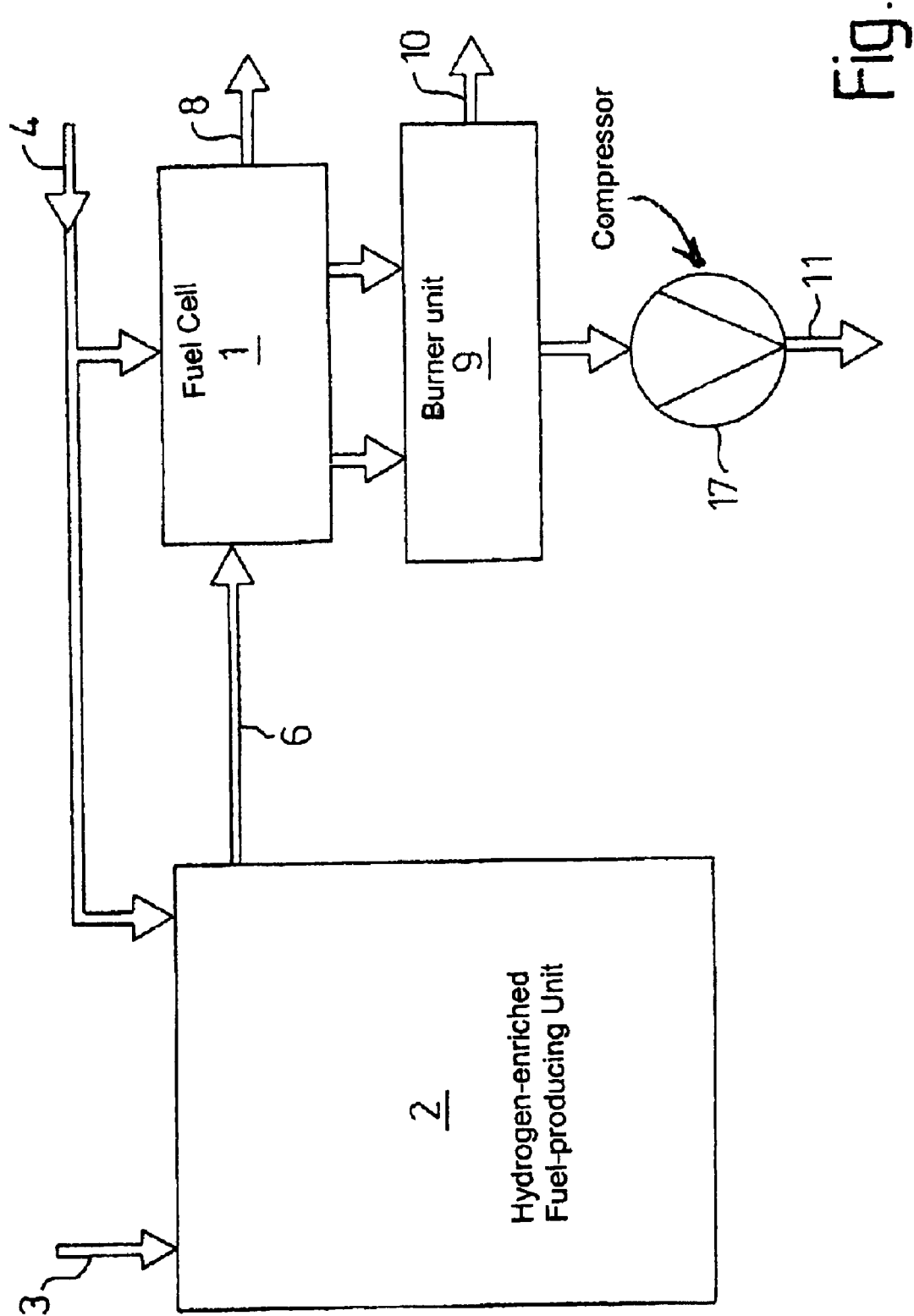
FIG. 2 is a schematic block diagram of a second embodiment of the fuel cell unit according to the invention.

An additional embodiment of the fuel cell apparatus is shown in FIG. 2. In contrast to the embodiment shown in FIG. 1 a compressor or pump 17 is arranged at the end of the flow stream, i.e. immediately upstream of the outlet 11 for the exhaust gas from the fuel cell apparatus. This allows the entire input of the operating substances 3, 4 and 6 to the fuel cell apparatus to be accomplished only by means of a single pump 17.

For example the common drawing in of the hydrogen-containing fuel occurs by a joint feed, which is performed at the same time as the combustion in burner 9. That is the burner flow is combined with the airflow in the burner 9 and combustion of residual hydrogen-containing gas is used for production of heat 10, particularly in the illustrated embodiments.

The embodiment shown in FIG. 2 reduces the number of required pumps 17 or the like in comparison to the state of the art, so that the efficiency of the apparatus is increased and the costs and the susceptibility to failure are reduced.

The disclosure in German Patent Application 101 57 708.7-45 of Nov. 24, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a fuel cell apparatus, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A fuel cell apparatus comprising
   at least one fuel cell (1) for converting chemical energy into electrical energy, said electrical energy being produced when a fuel is oxidized and an oxidizing agent is reduced in said at least one fuel cell;
   a fuel-producing unit (2) for making a hydrogen-enriched fuel (6) for the at least one fuel cell, and
   at least one compressor (5, 7) for producing at least one operating pressure in the fuel cell apparatus;
   wherein the at least one operating pressure is less than atmospheric pressure.

2. The fuel cell apparatus as defined in claim 1, wherein said at least one compressor is arranged downstream of the at least one fuel cell (1).

3. The fuel cell apparatus as defined in claim 1, wherein said at least one compressor is arranged between said at least one fuel cell (1) and an outlet (11) for exhaust gas.

4. The fuel cell apparatus as defined in claim 1, wherein said at least one compressor is arranged downstream of an opening for outflow of hydrogen-containing fluid and said opening is provided in the at least one fuel cell (1).

5. The fuel cell apparatus as defined in claim 1, wherein said at least one compressor comprises a compressor unit (7) and another compressor unit (5) separate from said compressor unit, said compressor unit (7) is arranged between said at least one fuel cell (1) and an outlet (11) for exhaust gas, and said another compressor unit (5) is arranged upstream of an entrance for a second oxygen-containing fluid (4), said entrance being provided in said at least one fuel cell (1).

6. The fuel cell apparatus as defined in claim 1, wherein said at least one compressor comprises a compressor unit (7) and another compressor unit (5) separate from said compressor unit, said compressor unit (7) is arranged downstream of an opening for outflow of hydrogen-containing fluid provided in the at least one fuel cell, and said another compressor unit (5) is arranged upstream of an entrance for a second oxygen-containing fluid (4), said entrance being provided in said at least one fuel cell (1).

7. The fuel cell apparatus as defined in claim 1, further comprising at least one burner unit (9) for combustion of a hydrogen-containing fluid arranged downstream of the at least one fuel cell (1).

8. The fuel cell apparatus as defined in claim 7, wherein said at least one burner unit (9) includes at least one heat exchanger for utilization of dissipated heat.

9. The fuel cell apparatus as defined in claim 7, further comprising a combined structural unit and wherein said combined structural unit comprises said at least one compressor (5,7) and said at least one burner unit (9).

10. The fuel cell apparatus as defined in claim 1, wherein said fuel-producing unit (2) is provided with an entrance for a hydrocarbon-containing starting material (3).

11. The fuel cell apparatus as defined in claim 10, wherein said fuel-producing unit (2) comprises means for making said hydrogen-enriched fuel from said hydrocarbon-containing starting material and said oxidizing agent.

12. The fuel cell apparatus as defined in claim 11, wherein said oxidizing agent comprises air.

* * * * *